G. BRYNING.
GARDEN SHOE.
APPLICATION FILED JULY 17, 1912.
1,044,440.
Patented Nov. 12, 1912.
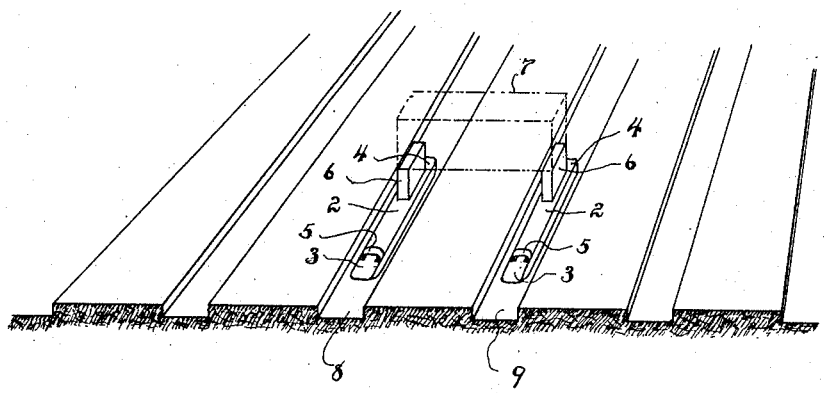
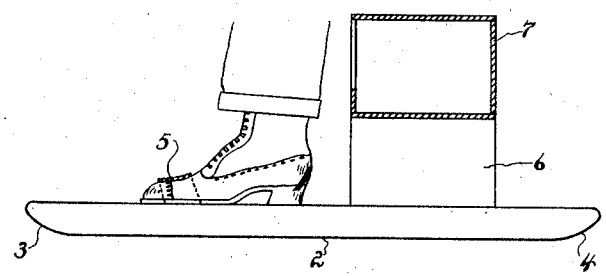

UNITED STATES PATENT OFFICE.

GEORGE BRYNING, OF LAWEN, OREGON.

GARDEN-SHOE.

1,044,440.  Specification of Letters Patent.  Patented Nov. 12, 1912.

Application filed July 17, 1912. Serial No. 709,846.

*To all whom it may concern:*

Be it known that I, GEORGE BRYNING, a citizen of the United States, residing at Lawen, in the county of Harney and State of Oregon, have invented a new and useful Improvement in Garden-Shoes; and I do hereby declare the following, when taken in connection with the accompanying drawings and the characters of reference marked thereon, to be a full, clear, and exact description of the same, and which said drawings constitute part of this application, and represent in—

Figure 1 a perspective view showing a pair of garden shoes or skees located in garden irrigation ditches. Fig. 2 a side view of one of the shoes and showing a sectional view of the box located on the blocks carried by the shoes.

This invention relates to an improvement in garden shoes, or, as they might be called, garden skees, that is, shoes or skees adapted to be used in gardens having irrigation ditches, the object of the invention being to provide shoes or skees which conform substantially in width to the width of the usual garden irrigation ditches which may be worn when planting, weeding or picking, and which will not break up the soil of a garden nor break up the irrigation ditches, will assist in keeping them in shape, and the invention consists in the construction hereinafter described and particularly recited in the claims.

In carrying out my invention, I employ a sole 2 formed from wood or any other suitable material, and of convenient length and thickness. Preferably the under face of the forward end or toe 3 will be rounded, as well as the under face of the heel 4, so that they will slide conveniently in either direction in the irrigation ditch. On the top of the sole is a toe clip 5 of leather or other suitable material into which the toe of the operator may extend, so that the shoes may be moved. Preferably and as herein shown, each sole is provided with a block 6, and these two blocks form a support for a wooden seat or box 7, and so raise the box that it will clear the plants between the ditches.

An operator places one of these shoes or skees on each foot, and one shoe will slide in one ditch, indicated by 8 in Fig. 1, and the other shoe in a ditch indicated by 9. The operator thus straddles the bed between the two ditches through which the shoes may be slid by the operator as he progresses in his work. The box 7 forms a convenient seat for the operator while bending over in planting, weeding or picking, and may contain tools, plants or other material. As soon as the operator has covered the surface between the ditches within reach, he moves forward, sliding first one foot and then the other, until he has reached the desired position when he again rests. During the movement he must, of course, raise the box 7 from the blocks 6. It will thus be seen that shoes are provided which keep the operator's feet out of the water in the ditches, and enable the operator to attend to the garden without stepping on the beds, and what is quite as important, without endangering the walls of the irrigation ditches.

I claim:—

1. The herein described garden shoe comprising a sole, a block secured to the upper face of said sole, and means for attaching the sole to the foot of the operator.

2. The herein described garden shoe comprising a sole, a toe-clip secured to the upper face of the sole whereby the sole may be attached to the foot of the operator, and a block mounted on the upper face of the sole in rear of the toe-clip.

In testimony whereof, I have signed this specification in the presence of two subscribing witnesses.

GEORGE BRYNING.

Witnesses:
J. C. HOWARD,
A. L. HOWARD.

Copies of this patent may be obtained for five cents each, by addressing the "Commissioner of Patents, Washington, D. C."